United States Patent [19]

Stine et al.

[11] Patent Number: 5,447,082
[45] Date of Patent: Sep. 5, 1995

[54] BLOCKING MECHANISM FOR SPLITTER TYPE AUXILIARY TRANSMISSION SECTION

[75] Inventors: Alan C. Stine, Kalamazoo; Joseph D. Reynolds, Climax, both of Mich.

[73] Assignee: Eaton Corporation, Cleveland, Ohio

[21] Appl. No.: 188,094

[22] Filed: Jan. 28, 1994

[51] Int. Cl.⁶ ............................................. F16H 3/097
[52] U.S. Cl. ....................................... 74/331; 74/339; 192/53 E
[58] Field of Search ................. 74/331, 339; 192/53 E

[56] References Cited

U.S. PATENT DOCUMENTS

| | | | |
|---|---|---|---|
| 3,364,768 | 1/1968 | Powell | 74/339 |
| 4,132,122 | 1/1979 | Richards | 74/339 |
| 4,620,623 | 11/1986 | Barksdale | 192/53 E |
| 4,703,667 | 11/1987 | Richards | 74/339 |
| 4,735,109 | 4/1988 | Richards et al. | 74/745 |
| 5,069,079 | 12/1991 | Vandervoort | 74/339 |
| 5,103,952 | 4/1992 | Reynolds | 74/339 |
| 5,111,922 | 5/1992 | Reynolds | 192/53 E |
| 5,390,561 | 2/1995 | Stine | 74/331 |
| 5,394,772 | 3/1995 | Stine et al. | 74/331 |

*Primary Examiner*—Dirk Wright
*Attorney, Agent, or Firm*—Brooks & Kushman

[57] ABSTRACT

A compound transmission is disclosed comprising a main section connected in series with a splitter type auxiliary section. A splitter clutch collar is fixed for rotation with a mainshaft and is axially movable therealong. In one embodiment, a blocking mechanism includes a pair of spaced apart rings having pins extending therebetween and through certain openings in a radially extending flange of the splitter clutch collar. Each of the pins has a shoulder cooperating with the associated flange opening for blocking engagement of the splitter clutch collar with either the mainshaft gear or a splitter gear when the splitter clutch collar and the gear to be engaged are not rotating at substantially the same speed. In a second embodiment, the blocking mechanism includes a pair of spaced apart rings having a plurality of legs extending therebetween and through certain of the openings in the flange. Each of the legs has a shoulder that cooperates with the associated flange opening to block engagement of the splitter clutch collar with either the mainshaft gear or the splitter gear until synchronous is achieved. In a third embodiment, the blocking mechanism includes a pair of spaced apart baulk rings. Each baulk ring has a set of chamfered teeth facing one of two sets of chamfered teeth of the splitter clutch collar. The opposed sets of chamfered teeth cooperate to block engagement of the splitter clutch collar with either the mainshaft gear or the splitter gear until synchronous is achieved.

20 Claims, 4 Drawing Sheets

BLOCKING MECHANISM FOR SPLITTER TYPE AUXILIARY TRANSMISSION SECTION

TECHNICAL FIELD

This invention relates to compound transmissions including a multispeed main transmission section connected in series with a multispeed auxiliary transmission section, and in particular to such a compound transmission including a splitter type auxiliary section having a blocking mechanism for preventing a splitter shift when the splitter clutch collar and the splitter gear are not rotating at substantially the same speeds.

BACKGROUND ART

Compound change gear transmissions of the type having one or more auxiliary sections connected in series with a main transmission section are known in the prior art. Briefly, by utilizing main and auxiliary transmission sections connected in series, assuming proper sizing of the ratio steps, the total of available transmission ratios is equal to the product of the main and auxiliary section ratios. By way of example, a compound change gear transmission comprising a four (4) speed main section connected in series with a three (3) speed auxiliary section will theoretically provide twelve (4×3=12) available ratios.

Auxiliary transmission sections are of three general types: range type, splitter type or combined range/splitter type. In compound transmissions having a range type auxiliary section, the ratio step or steps are greater than the total ratio coverage of the main transmission section and the main section is shifted progressively through its ratios in each range. Examples of compound transmissions having range type auxiliary sections may be seen by reference to U.S. Pat. No. 3,105,395; U.S. Pat. No. 2,637,222; and U.S. Pat. No. 2,637,221, the disclosures of which are hereby incorporated by reference.

In compound transmissions having a splitter type auxiliary section, the ratio steps of the splitter auxiliary section are less than the ratio steps of the main transmission section and each main section ratio is split, or subdivided, by the splitter section. Examples of compound change gear transmissions having splitter type auxiliary sections may be seen by reference to U.S. Pat. No. 4,290,515; U.S. Pat. No. 3,799,002; U.S. Pat. No. 4,440,037; and U.S. Pat. No. 4,527,447, the disclosures of which are hereby incorporated by reference.

In a combined range and splitter type auxiliary section, or sections, both range and splitter type ratios are provided allowing the main section to be progressively shifted through its ratios in at least two ranges and also allowing the main section ratios to be split in at least one range. Examples of a compound transmission having a single combined range/splitter type auxiliary section may be seen by reference to U.S. Pat. No. 3,283,613 and U.S. Pat. No. 3,648,546, the disclosures of which are hereby incorporated by reference. Eaton also produces the "Super 10" compound transmission which has a 2+1 main section and an auxiliary section having both range and splitter gears. All three forward ratios are used in the low range, while two forward ratios are repeated in the high range. This results in a standard 5 speed shift pattern. Another example of a combined range and splitter type compound transmission is the "Ecosplit" model of transmission sold by Zahnradfabrik Friedrichshafen Aktiengeseushaft of Friedrichshafen, Germany, which utilizes a separate splitter auxiliary section in front of, and a separate range auxiliary section behind, the main transmission section. Still another example is the RM0-13-145A thirteen speed transmission sold by Rockwell Corporation, in which the high range forward ratios are split.

Splitter shift systems may be either synchronized on non-synchronized. Conventional synchronizing systems, including those on compound transmissions having head end mounted splitters, use high force actuators which typically develop 500-600 pounds of force to effect the splitter shift. Furthermore, these synchronized systems generally also require that the master clutch be disengaged on all splits, and employ costly master clutch interlocks in the case of head end mounted splitters. While nonsynchronized splitter clutching systems on either front or rear end splitters use lower force actuators, the resulting splitter shifts are often neither smooth nor jerkless.

SUMMARY OF THE INVENTION

The present invention is a compound transmission comprising a main transmission section connected in series with either a head end or a rear end auxiliary transmission section. A splitter clutch collar is fixed for rotation with a mainshaft and is axially movable therealong, while an output shaft has a splitter gear rotatably mounted thereon. In one embodiment of the present invention, the splitter clutch collar includes a radially extending flange having a plurality of circumferentially spaced openings therethrough, and a blocking mechanism includes a pair of spaced apart rings having a plurality of pins extending therebetween and through certain of the openings in the flange. Each of the pins has a central section of reduced cross sectional area which defines a shoulder adapted to cooperate with the associated flange opening for blocking engagement of the splitter clutch collar with either the mainshaft gear or the splitter gear when the splitter clutch collar and the gear to be engaged are not rotating at substantially the same speed.

In another embodiment of the present invention, the blocking mechanism includes a pair of spaced apart rings having a plurality of legs extending therebetween and through certain of the openings in the flange. Each of the legs has a shoulder that cooperates with the associated flange opening to block engagement of the splitter clutch collar with either the mainshaft gear or the splitter gear when the splitter clutch collar and the gear to be engaged are not rotating at substantially the same speed.

In still another embodiment of the present invention, the blocking mechanism includes a pair of spaced apart baulk rings. Each baulk ring has a set of chamfered teeth facing one of two sets of chamfered teeth of the splitter clutch collar. The opposed sets of chamfered teeth cooperate to block engagement of the splitter clutch collar with either the mainshaft gear or the splitter gear when the splitter clutch collar and the gear to be engaged are not rotating at substantially the same speed.

Accordingly, it is an object of the present invention to provide a new and improved compound transmission including a splitter type auxiliary section having a nonsynchronizing blocking mechanism for blocking engagement of the splitter clutch collar with either a mainshaft gear or the splitter gear when the jaw clutch members are not rotating at substantially the same speed.

This and other objects and advantages of the present invention will become apparent from a reading of the detailed description of the preferred embodiment taken in connection with the drawings.

DESCRIPTION OF THE PREFERRED EMBODIMENT

Figure 1:
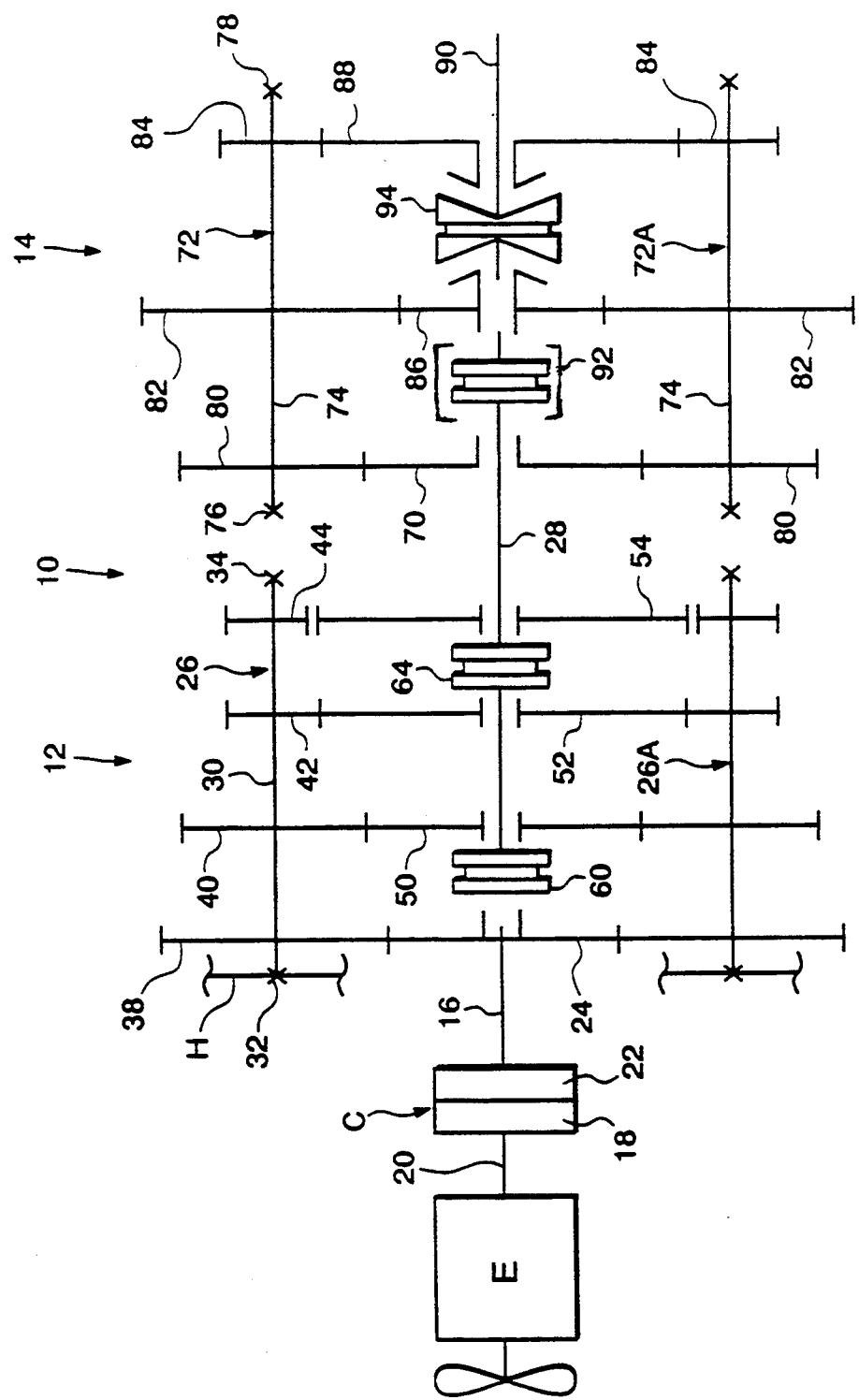
FIG. 1 is a schematic illustration of a compound transmission utilizing the auxiliary section of the present invention.

Certain terminology will be used in the following description for convenience in reference only and will not be limiting. The words "upwardly," "downwardly," "rightwardly," and "leftwardly" will designate directions in the drawings to which reference is made. The words "forward" and "rearward" will refer respectively to the front and rear ends of the transmission as conventionally mounted in a vehicle, being respectfully from the left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import. The term "compound transmission" is used to designate a change speed or change gear transmission having a multiple forward speed main transmission section and a multiple speed, head end or rear end mounted auxiliary transmission section connected in series whereby the selected gear reduction in the main transmission section may be compounded by further selected gear reduction in the auxiliary transmission section.

FIG. 1 shows a compound transmission 10 according to the present invention comprising a multiple speed main transmission section 12 connected in series with an auxiliary transmission section 14. Typically, transmission 10 is housed within a single housing and includes an input shaft 16 driven by a prime mover such as a diesel engine E through a selectively disengaged, normally engaged friction master clutch C having an input or driving portion 18 drivingly connected to the engine crankshaft 20 and a driven portion 22 rotatably fixed to the transmission input shaft 16.

In main transmission section 12, the input shaft 16 carries an input gear 24 for simultaneously driving a plurality of substantially identical main section countershaft assemblies 26 and 26A at substantially identical rotational speeds. In the transmission 10 illustrated, two =substantially identical main section countershaft assemblies are provided on opposite sides of a mainshaft 28, which is generally coaxially aligned with the input shaft 16. Each of the main section countershaft assemblies 26 and 26A comprises a main section countershaft 30 supported by bearings 32 and 34 in housing H, only a portion of which is schematically illustrated. Each of the main section countershafts 30 is provided with an identical grouping of main section countershaft gears 38, 40, 42 and 44 fixed for rotation therewith. A plurality of main section drive or mainshaft gears 50, 52 and 54 surround the mainshaft 28 and are selectively clutchable, one at a time, to the mainshaft for rotation therewith by sliding clutch collars 60 and 64 as is well known in the art.

Clutch collar 60 may also be utilized to clutch input gear 24 to mainshaft 28 to provide a direct drive relationship between input shaft 16 and mainshaft 28. Preferably, each of the main section mainshaft gears encircles the mainshaft 28 and is floatingly supported by the associated countershaft gear group, which mounting means and special advantages resulting therefrom are explained in greater detail in U.S. Pat. Nos. 3,105,395 and 3,335,616, the disclosures of which are hereby incorporated by reference. Main section mainshaft gear 54 is the reverse gear and is in continuous meshing engagement with countershaft gears 44 by means of conventional intermediate idler gears (not shown). Typically, clutch collars 60 and 64 are axially positioned by means of shift forks (not illustrated) associated with a shift bar housing assembly (not illustrated) as is well known in the art. Clutch collars 60 and 64 are of the well known nonsynchronized double acting jaw clutch type, and are three position clutches in that they may be positioned in a centered, non-engaged position as illustrated or in a fully rightwardly engaged or fully leftwardly engaged position.

Auxiliary transmission section 14 is connected in series with main transmission section 12. Mainshaft 28 extends into the auxiliary section 14 and carries an auxiliary drive gear 70 rotatably mounted thereon. Each of two auxiliary countershaft assemblies 72 and 72A comprises an auxiliary countershaft 74 supported by bearings 76 and 78 in housing H and carrying three auxiliary section countershaft gears 80, 82 and 84 fixed for rotation therewith. Auxiliary section countershaft gears 80 are constantly meshed with auxiliary drive gear 70 while auxiliary section countershaft gears 82 and 84, respectively, are constantly meshed with auxiliary driven gears 86 and 88, which are rotatably mounted on output shaft 90.

A two-position slidable jaw clutch collar 92 is carried on the end of mainshaft 28, and a synchronized sliding two-position clutch assembly 94 is carried on the output shaft 90. Clutch assemblies 92 and 94 may both be selectively located in the rightwardmost or leftwardmost axial positions, but not normally in a centered non-engaged position therebetween. Typically, clutch assemblies 92 and 94 are axially positioned in a selected axial position by means of shift forks positioned by a remotely controlled gas or fluid actuated piston assembly as is well known in the art.

Jaw clutch collar 92 is utilized to selectively couple either the auxiliary drive gear 70 or the splitter/range gear 86 to the mainshaft 28, while synchronized clutch assembly 94 is utilized to selectively couple the splitter/range gear 86 or the range gear 88 to the output shaft 90, as described in U.S. Pat. No. 4,754,665, assigned to the assignee of the present invention and hereby incorporated by reference.

Figure 2:
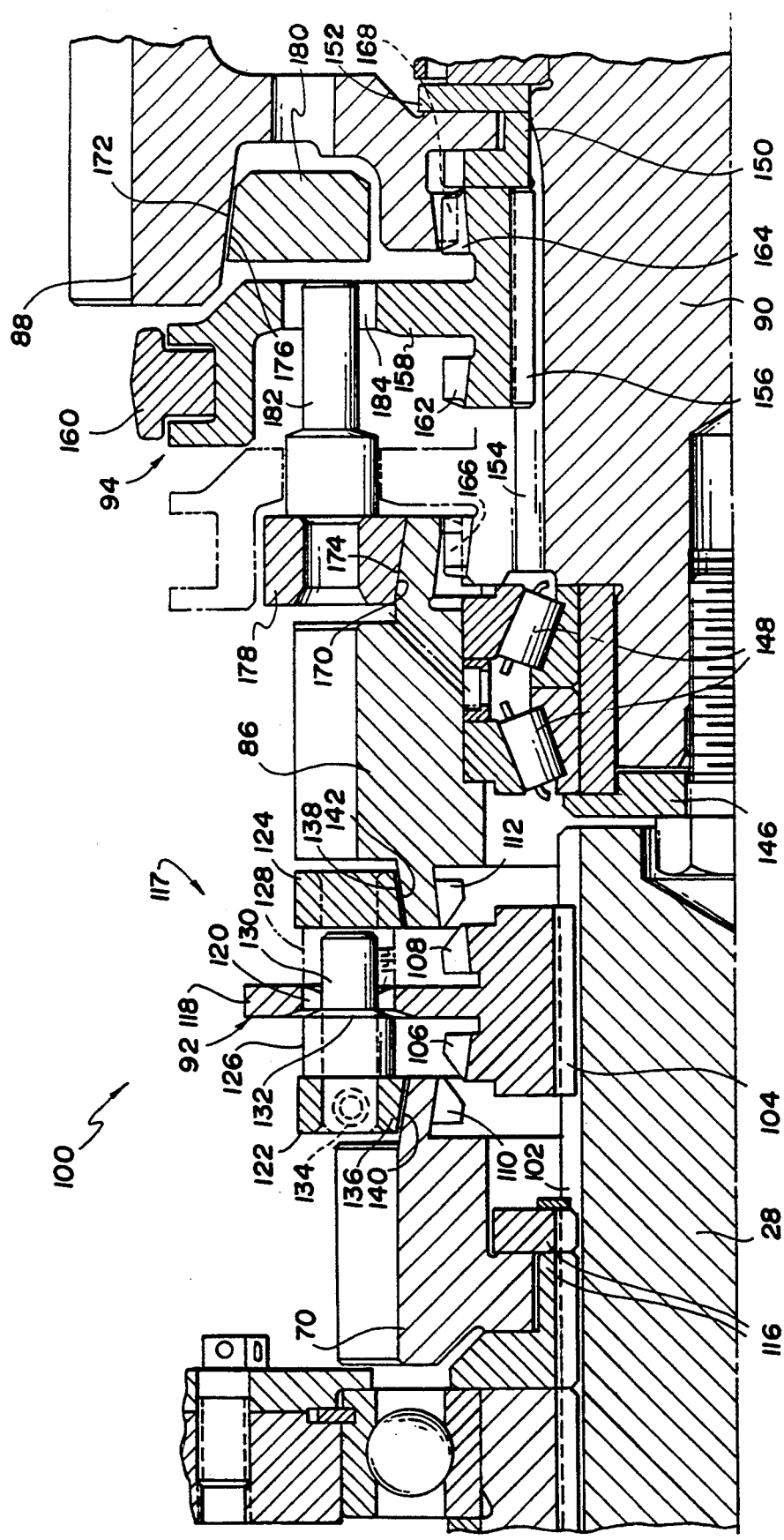
FIG. 2 is a partial cross-sectional view of the compound transmission including a splitter type auxiliary section having a pin type blocking mechanism.

FIG. 2 shows one embodiment 100 of the present invention wherein the rearward end of mainshaft 28 is provided with external splines 102 which mate with internal splines 104 provided on splitter clutch collar 92 for rotationally coupling the clutch collar to the mainshaft while allowing relative axial movement therebetween. The clutch collar 92 is provided with clutch teeth 106 and 108 for selective axial engagement with clutch teeth 110 and 112 provided on gears 70 and 86, respectively. Gear 70 surrounds mainshaft 28 and is normally free to rotate relative thereto and is axially retained relative to the mainshaft by means of retainers 116.

A blocking mechanism 117 is provided for the splitter clutch collar 92, and includes a radially extending flange 118 which has a plurality of circumferentially spaced openings 120 therethrough. A pair of spaced apart rings 122 and 124 each have a plurality, preferably three, of pins 126 and 128, respectively, extending therebetween and through certain of the openings 120 in the flange 118. Each of the pins 126 has a central section 130 of reduced cross sectional area which defines a shoulder 132. The pins 126 and 128 are biased by springs 134 located in one or both rings 122 and 124 to a preblocked position wherein the central section 130 of each pin abuts the perimeter of its corresponding opening 120.

The rings 122 and 124 have respective conical surfaces 136 and 138 which frictionally engage conical surfaces 140 and 142 provided on the gears 70 and 86 when the clutch collar 92 is moved leftwardly or rightwardly, respectively. However, the rings 122 and 124 do not perform a synchronizing function, because when a splitter shift is in progress, the master clutch C may remain engaged so that the splitter clutch collar 92 is driven by the engine while the gear 86 is driven by the rear wheels of the vehicle. The resulting difference in applied forces is much too great for the frictional engagement of the conical surfaces of the rings 122 and 124 to significantly affect. Instead, when the splitter clutch collar 92 and the rings 122 and 124 are rotating at a speed different than the gear to be engaged, the pins 126 and 128 remain circumferentially displaced in the openings 120. The clutch collar 92 cannot thereafter be axially moved to complete gear engagement until synchronous is achieved, because the shoulders 132 continue to abut the openings. Thus, the shoulders 132 cooperate with their associated flange openings 120 for blocking significant relative axial movement of the splitter clutch collar 92 with respect to the mainshaft 28 when the splitter clutch collar and the auxiliary drive gear 70 are not rotating at substantially the same speed. In the same way, an opposite shoulder 144 of the pins 128 prevents rightward axial movement of splitter clutch collar 92 to engage the splitter gear 86 until substantially synchronous rotation is achieved between the splitter clutch collar and the splitter gear.

Because the blocking mechanism 117 does not perform a synchronizing function, low force shift actuators can be used to move the splitter clutch collar 92. Typically these low force actuators develop only about 80 pounds force to effect the splitter shift. Furthermore, the splitter shift can be accomplished without disengaging the master clutch, while the advantage of smooth shifts normally associated with synchronized systems is achieved.

Splitter/range gear 86 is rotatably supported at the inward end 146 of ouput shaft 90 by means of a pair of thrust bearings 148 while range gear 88 surrounds the output shaft and is axially retained thereon by means of thrust washers 150 and 152. Located axially between gears 86 and 88, and rotationally fixed to output shaft 90 by means of external splines 154 and internal splines 156, is the double acting two position synchronized clutch assembly 94. Many of the well known synchronized positive clutch structures are suitable for use in the auxiliary section of the present invention. The synchronized clutch assembly 94 illustrated is of the pin type described in above mentioned U.S. Pat. No. 4,462,489. Briefly, the clutch assembly 94 includes a slidable jaw clutch member 158 axially positioned by a shift fork 160 and carrying clutch teeth 162 and 164, respectively, for axial engagement with clutch teeth 166 and 168, respectively, carried by gears 86 and 88, respectively. Gears 86 and 88 define cone friction surfaces 170 and 172, respectively, for frictional synchronizing engagement with matching frictional cone surfaces 174 and 176, respectively, carried by friction rings 178 and 180, respectively, of the synchronized clutch assembly. Blocker pins 182 are rotationally fixed to the friction ring 178 and interact with blocker openings 184 carried by the sliding member 158 to provide the blocking function as is well known in the art. Similar blocking pins are fixed to the friction ring 180 and interact with other blocker openings in the sliding member 158. Synchronizing assembly 94 may also include a plurality of spring pins (not shown) for providing initial engagement of the conical friction surfaces at the initiation of a clutch engagement operation.

Figure 3:
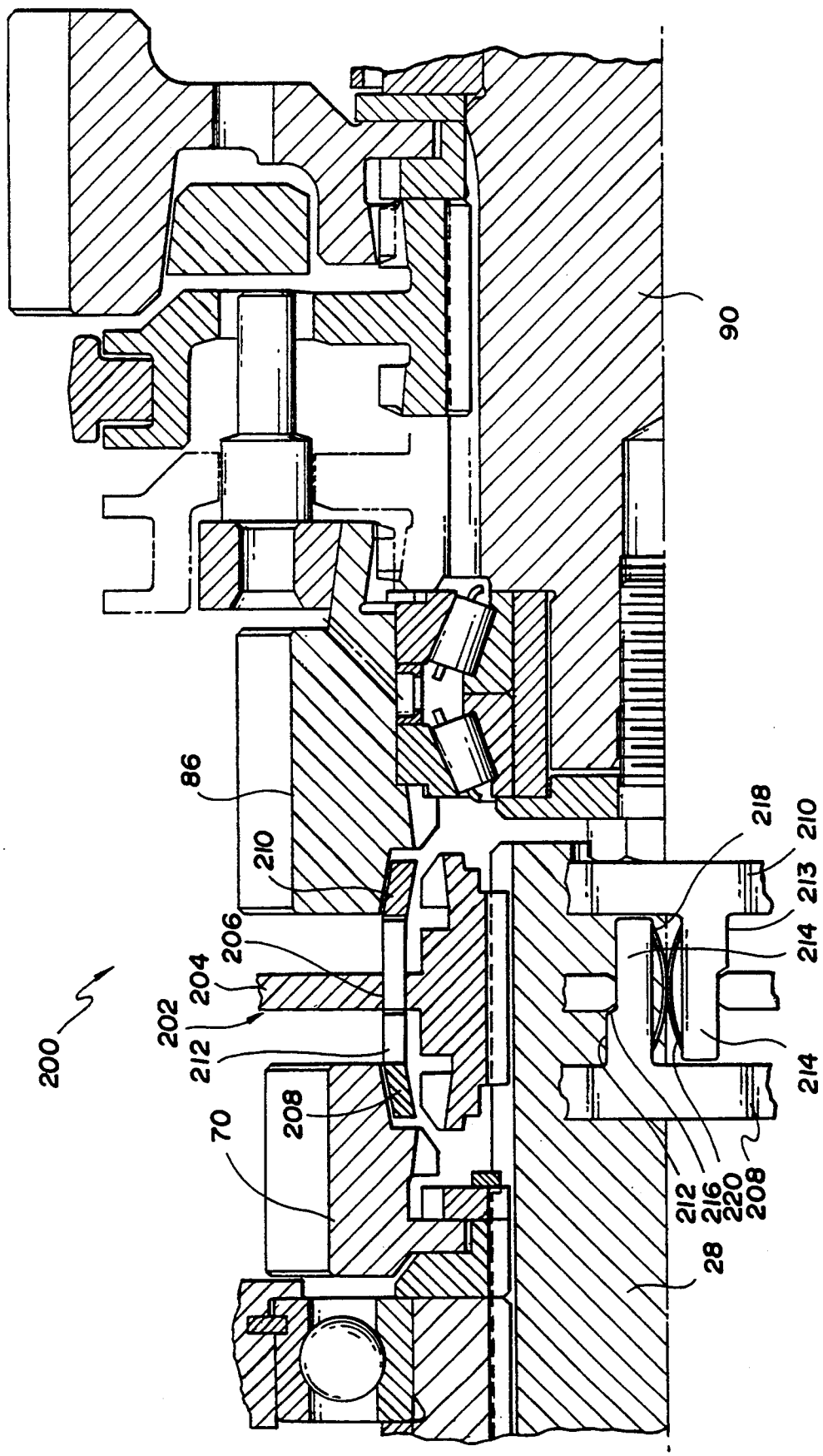
FIG. 3 is a partial cross-sectional view of the compound transmission including an alternative embodiment of the blocking mechanism shown in side elevation.

FIG. 3 shows an alternative embodiment 200 of the blocking mechanism. The splitter clutch collar 202 is fixed for rotation with and is axially movable along the mainshaft 28, and includes a radially extending flange 204 having a plurality of circumferentially spaced openings 206 therethrough. A pair of spaced apart rings 208 and 210 are provided, each having a plurality of legs respectively 212 and 213 extending therefrom and through certain of the openings 206 in the flange 204. Each of the legs 212 and 213 has a central section 214 of reduced cross sectional area which defines a shoulder 216 adapted to cooperate with the associated flange opening 206 for blocking engagement of the splitter clutch collar 202 with either the mainshaft gear 70 or the splitter gear 86 when the splitter clutch collar and the gear to be engaged are not rotating at substantially the same speed. Leaf springs 218 and 220 are also provided disposed between at least one pair, and preferably each pair, of legs 212 and 213 extending from opposite rings 208 and 210. The leaf springs 218 and 220 function as spring means for biasing the legs of the rings toward abutment with the openings in the flange.

Figure 4:
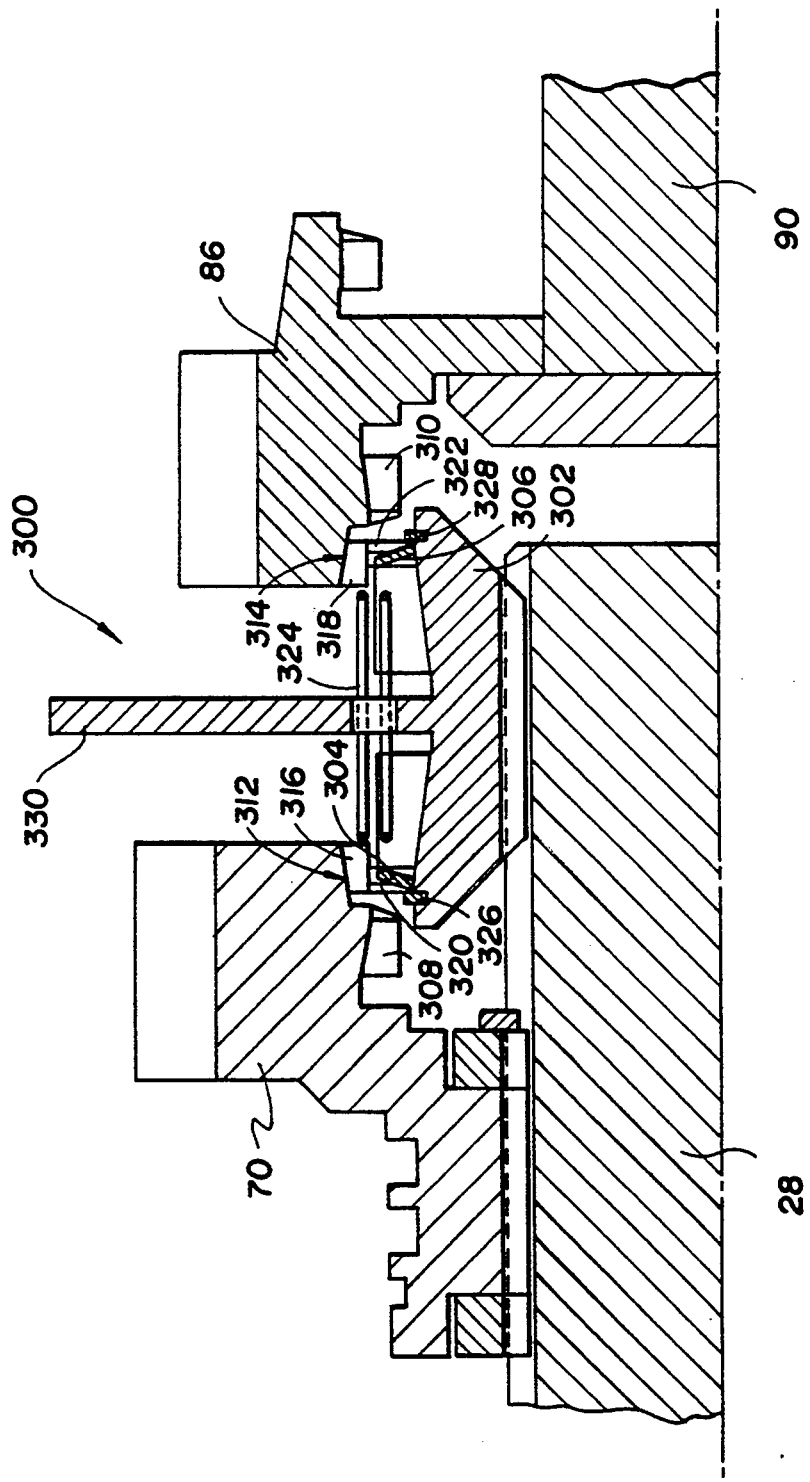
FIG. 4 is a partial cross-sectional view of the compound transmission including another alternative embodiment of the blocking mechanism.

FIG. 4 shows another alternative embodiment 300 of the blocking mechanism. The splitter clutch collar 302 is fixed for rotation with and is axially movable along the mainshaft 28, and includes two opposite sets 304 and 306 of circumferentially spaced teeth. The teeth 304 and 306 are pointed or chamfered, and are adapted to engage clutch teeth 308 and 310 on the gears 70 and 86, respectively. The blocking mechanism 300 includes a pair of spaced apart baulk rings 312 and 314, each of which has a ramped blocker, respectively 316 and 318, and a set of circumferentially spaced chamfered teeth 320 and 322, respectively. The teeth 320 and 322 face inwardly, i.e. in opposite axial directions toward gear teeth 304 and 306, respectively. The baulk rings 312 and 314 are biased axially away from each other by a spring 324, and are retained on the splitter clutch collar 302 by snap rings 326 and 328. When for example the splitter clutch collar is moved toward engagement with the gear 70, the blocker 316 comes into frictional contact with the conical surface of the gear 70 and the baulk ring 312 is indexed over by the applied cone torque. The chamfered teeth 304 are then held tightly against the chamfered teeth 320 of the baulk ring 312, preventing further leftward axial movement of the splitter clutch collar 302. When synchronous is finally achieved through throttle manipulation, the cone torque is reduced and the force applied axially through the shift fork 330 can slip the chamfered teeth out of abutment. In the same way, the chamfered teeth 306 and 322 cooperate to block engagement of the splitter clutch collar with the splitter gear 86 when the splitter clutch collar and the splitter gear are not rotating at substantially the same speed.

It should be understood that any of the blocking mechanisms described herein can be used in either a head end or a rear end mounted splitter section. Although the present invention has been set forth with a certain degree of particularity, it should also be understood that various modifications are possible without departing from the spirit and the scope of the invention as hereinafter claimed.

What is claimed is:

1. A compound transmission comprising:
   an output shaft having a splitter gear mounted thereon;
   a splitter clutch collar fixed for rotation with a mainshaft and being axially movable therealong to selectively engage one of the splitter gear and a mainshaft gear, the splitter clutch collar including a radially extending flange having a plurality of cirucumferentially spaced openings therethrough; and
   a blocking mechanism including a pair of spaced apart rings having a plurality of members extending therebetween and through at least one of the plurality of openings in the flange, each of the plurality of members having a section of reduced cross sectional area which defines a shoulder adapted to cooperate with an associated one of the plurality of flange openings for blocking engagement of the splitter clutch collar with the mainshaft gear and the splitter gear until the splitter clutch collar and one of the mainshaft gear and the splitter gear are rotating at substantially synchronous speeds.

2. The compound transmission of claim 1 wherein the output shaft is generally coaxial with the mainshaft.

3. The compound transmission of claim 1 wherein the mainshaft provides three selectable forward speed ratios.

4. The compound transmission of claim 1 wherein the blocking mechanism further includes at least one spring for each of the plurality of members for biasing each member toward a perimeter of a corresponding one of the plurality of openings.

5. The compound transmission of claim 4 wherein the at least one spring circumferentially biases a corresponding one of the plurality of members.

6. The compound transmission of claim 4 wherein the at least one spring radially biases a corresponding one of the plurality of members.

7. The compound transmission of claim 6 wherein the at least one spring comprises at least one leaf spring.

8. The compound transmission of claim 1 wherein each of the plurality of members comprises a pin.

9. The compound transmission of claim 1 wherein each of the plurality of members comprises an integral portion of one of the pair of spaced apart rings.

10. The compound transmission of claim 1 wherein the splitter clutch collar includes two sets of circumferentially spaced chamfered teeth facing in opposite axial directions, the pair of spaced apart rings being baulk rings each having a set of chamfered teeth facing one of said two sets of chamfered teeth of the splitter clutch collar and cooperating therewith for blocking engagement of the splitter clutch collar with the mainshaft gear and the splitter gear until the splitter clutch collar and one of the mainshaft gear and the splitter gear are rotating at substantially synchronous speeds.

11. The compound transmission of claim 10 wherein each of the plurality of members comprises a spring for biasing the pair of spaced apart rings axially away from one another.

12. A compound transmission comprising:
    a mainshaft having a mainshaft gear mounted thereon;
    an output shaft having a splitter gear mounted thereon;
    a splitter clutch collar fixed for rotation with the mainshaft and being axially movable therealong to selectively engage one of the mainshaft gear and the splitter gear, the splitter clutch collar including a radially extending flange having a plurality of circumferentially spaced openings therethrough; and
    a blocking mechanism including a pair of spaced apart rings having a plurality of legs extending therefrom and through at least one of the openings in the flange, each of the plurality of legs having a section of reduced cross sectional area which defines a shoulder adapted to cooperate with an associated flange opening for blocking engagement of the splitter clutch collar with the mainshaft gear and the splitter gear until the splitter clutch collar and one of the mainshaft gear and the splitter gear are rotating at substantially synchronous speeds.

13. The compound transmission of claim 12 further comprising spring means for biasing the legs of the rings toward abutment with the openings in the flange.

14. The compound transmission of claim 13 wherein the spring means comprises leaf springs disposed between a pair of legs extending from opposite rings.

15. The compound transmission of claim 12 wherein the output shaft is generally coaxial with the mainshaft.

16. The compound transmission of claim 12 wherein the mainshaft has a plurality of gears mounted thereon to provide a plurality of selectable forward speed ratios between the mainshaft and the output shaft.

17. The compound transmission of claim 16 wherein the mainshaft provides three selectable forward speed ratios.

18. A compound transmission comprising:
    a mainshaft having a mainshaft gear mounted thereon;
    an output shaft having a splitter gear mounted thereon;
    a splitter clutch collar fixed for rotation with the mainshaft and being axially movable therealong to selectively engage one of the mainshaft gear and the splitter gear, the splitter clutch collar including two sets of circumferentially spaced chamfered teeth facing in opposite axial directions; and a blocking mechanism including a pair of spaced apart baulk rings, each baulk ring having a set of chamfered teeth facing one of said sets of chamfered teeth of the splitter clutch collar and cooperating therewith for blocking engagement of the splitter clutch collar with the mainshaft gear and the splitter gear until the splitter clutch collar and one of the mainshaft gear and the splitter gear are rotating at substantially synchronous speeds.

19. The compound transmission of claim 18 further comprising spring means for biasing the baulk rings axially away from each other.

20. The compound transmission of claim 18 wherein the splitter gear is rotatably mounted on the output shaft.

* * * * *